United States Patent [19]

Brown et al.

[11] Patent Number: 4,609,773
[45] Date of Patent: Sep. 2, 1986

[54] SEAL ASSEMBLY

[75] Inventors: Allan P. Brown, Ottawa; Leonard J. Charlebois, Kanata, both of Canada

[73] Assignee: Northern Telecom Limited, Montreal, Canada

[21] Appl. No.: 752,746

[22] Filed: Jul. 8, 1985

[51] Int. Cl.⁴ .................... F16J 15/02; H02G 15/113
[52] U.S. Cl. ........................................ 174/92; 277/58; 277/181; 277/189; 277/192; 277/212 F
[58] Field of Search .................. 277/58, 59, 215, 154, 277/192, 199, 61, 63, 126, 129, 181–184, 50, 51, 44, 45, 47, 35, 212 F, 189; 174/72 R, 92

[56] References Cited

U.S. PATENT DOCUMENTS

| | | | |
|---|---|---|---|
| 2,246,709 | 6/1941 | Allen | 277/129 |
| 2,771,502 | 11/1956 | King et al. | 174/92 |
| 3,025,118 | 3/1962 | Ver Nooy | 277/212 C X |
| 3,045,830 | 7/1962 | Fulton | 277/206 X |
| 3,339,011 | 8/1967 | Ewers, Jr. et al. | 174/92 |
| 3,663,740 | 5/1972 | Dellett | 174/77 R X |
| 3,692,926 | 9/1972 | Smith | 174/77 R X |
| 4,508,312 | 4/1985 | Taylor et al. | 277/129 X |
| 4,538,021 | 8/1985 | Williamson, Jr. | 174/92 X |

Primary Examiner—Allan N. Shoap
Attorney, Agent, or Firm—R. J. Austin

[57] ABSTRACT

A seal assembly with a split housing provided with two axially spaced recesses for two seals. In each split housing member recess one-half of a seal is held. The two seal halves of each housing member are held in place by an elongate holding member which is secured to the housing member and mechanically holds the seal halves in their respective recesses. Rapid assembly and disassembly of the seal parts is thus possible.

4 Claims, 5 Drawing Figures

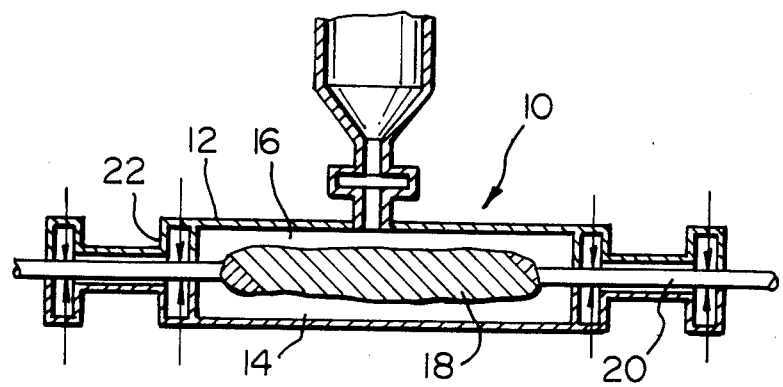
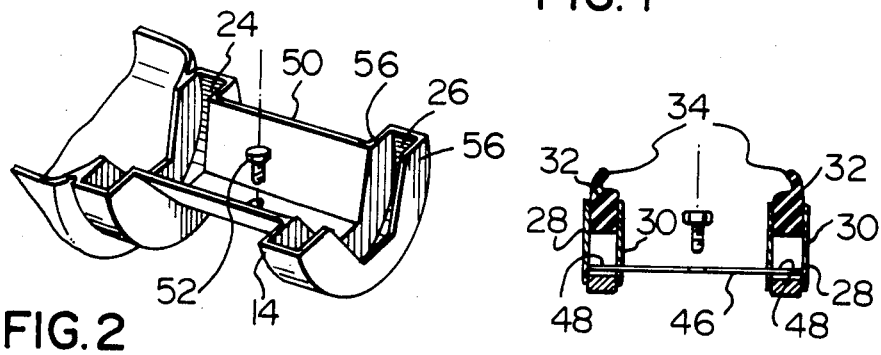
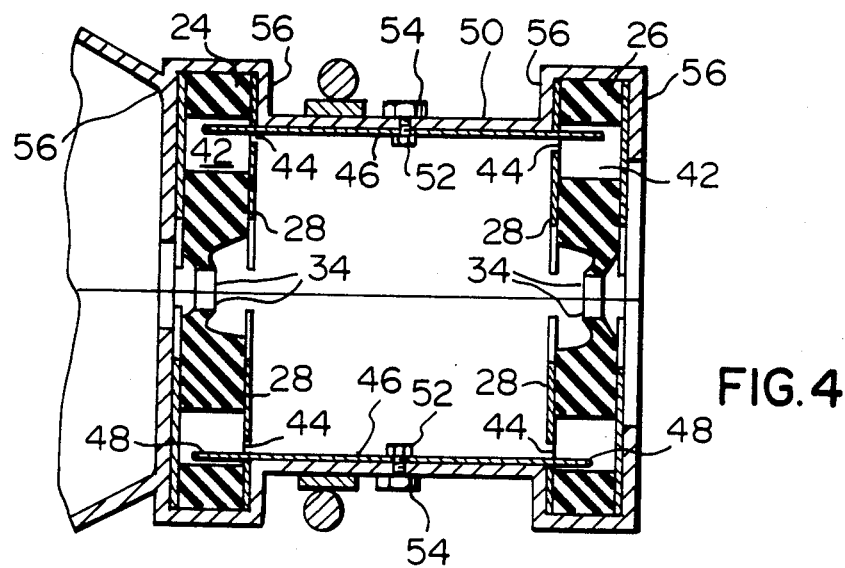

SEAL ASSEMBLY

This invention relates to seal assemblies.

In some industries, it is necessary for operators working in the field to seal articles, for instance agains the effects of the surrounding atmosphere. Various methods of sealing have been suggested and one which has been recently proposed and has been successfully used is a method in which the article is surrounded by a mold and an encapsulation is formed around the article by transfering heated molten plastics material into the mold cavity and allowing it to cool and set. Encapsulations formed by molded techniques have successfully been employed in the telecommunications cable industry. In the telecommunications cable industry, it is necessary to form splices in the field and this involves cutting into a cable to enable the conductors to be reached. The conductors are then severed and connected to other conductors leading from the cable, the connection between two conductors being referred to herein as a splice. It is then necessary to seal around the area of the splice to prevent it from being adversely affected by atmospheric conditions such as dampness. The use of polymeric materials as molded encapsulations around such splices have simplified previous encapsulation procedures and also has cheapened the encapsulation process.

Successful methods of sealing including molded encapsulations have been described in U.S. Pat. Nos. 4,152,539 granted May 1, 1979 and 4,322,573 granted Mar. 13, 1982, both patents being in the name of L. J. Charlebois.

When forming molded encapsulations around splices, low pressure molding techniques may be used, i.e. up to a molding pressure of 35 lbs. psi. Nevertheless, mold seals are necessary and such seals have to be placed around the cable jacket to ensure that the mold is completely filled with encapsulating material and substantially no wastage occurs. It is of practical benefit particularly when working in the field, to use a single mold for many or all cable sizes. Such a universal mold use may necessitate using seals of different sizes. For convenience and efficiency, and to assist the operator, it is important that the mold seals are easily removable and replacable during assembly and disassembly of the apparatus.

The present invention is concerned with a seal assembly which includes seal members which are easily and quickly detachable and attachable to housing members of the mold.

Accordingly, the present invention provides a seal assembly comprising two housing members which, when assembled together, provide a substantially cylindrical housing with the members diametrically opposed, each member having two axially spaced circumferentially extending recesses with each recess housing an arcuate seal member and with each seal member combining with a seal member of the other housing member to form a complete seal in an assembled condition of the housing members, and within each housing member there is provided a seal member retaining means comprising an elongate holding member secured to the housing member, the holding member extending between and mechanically holding the seal members in the housing member.

Thus the invention provides a holding member in each housing member and the holding member may be simply retained by an attachment bolt or other simple mechanical holding arrangement. Thus the bolt upon being removed from the housing member allows for ease of removal of the holding member together with arcuate seal members. In a preferred arrangement, the seal members are provided with aligned slots or orifices through which the elongate holding member passes. For rigidity, it is preferable for each seal member to have a rigid support member and the rigid support member is formed with the orifice. Hence the rigid support member is held by the holding member securely in position without any resiliency in the fixing.

One embodiment of the invention will now be described, by way of example, with reference to the accompanying drawings, in which:

FIG. 1 is a cross-sectional view through a mold containing a cable and ready for forming of an encapsulation;

FIG. 2 is an isometric view taken at one end of a mold half and on a larger scale than FIG. 1 and showing the housing member for a seal assembly;

FIG. 3 is a cross-sectional view through a seal assembly of parts of the seal assembly before adding the parts to the housing member;

FIG. 4 is a view similar to FIG. 3 of a complete seal assembly; and

Figure 5:
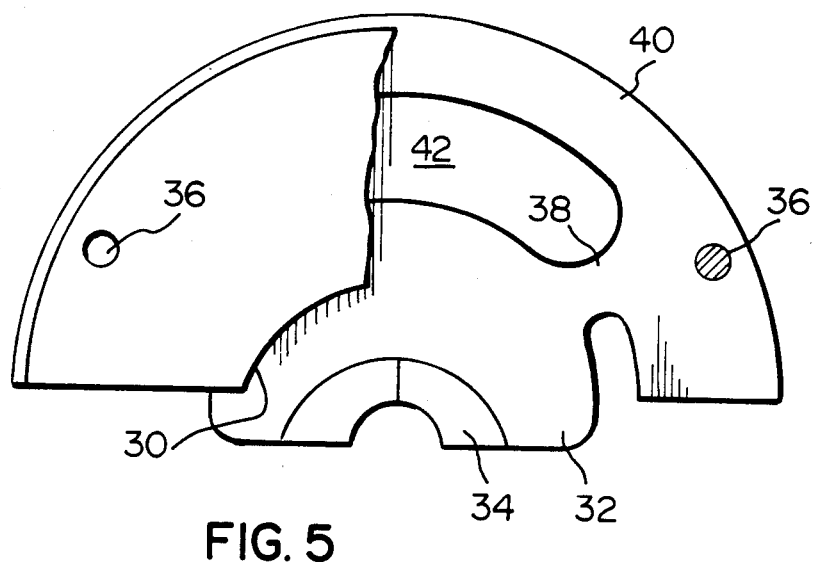
FIG. 5 is an end elevation (partly in section) of a sealing member of a seal assembly and on a larger scale than FIG. 4.

As shown by FIG. 1, a mold 10 comprises two mold halves 12 and 14 which together as shown by FIG. 1, define a mold cavity 16 for containing a splice region 18 of a cable 20. The encapsulation is conveniently formed by any of the methods described in U.S. Pat. Nos. 4,152,539, granted May 1, 1979 and 4,322,573, granted Ma r. 13, 1982, both patents in the name of L. J. Charlebois. The mold is used for providing a molded plastics encapsulation around the spliced region 18. The mold comprises at each of its ends a seal assembly 22 which is more clearly shown in the other Figures of the drawings.

Each mold half is a sub-assembly comprising a housing 13 and parts of the seal assemblies 22 as will now be described.

As shown by FIG. 2, each housing 13 comprises two semi-circular, axially spaced grooves 24 and 26 at each end of the housing. Each of grooves 24 and each of grooves 26 are radially aligned the mold halves brought together and the mold closed around the cable as shown. Each groove 24 and 26 contains a semi-circular sealing member 28 and with the grooves radially aligned, the sealing members coact to provide two complete seals around the cable at each end of the mold. This is shown by FIG. 4. Each sealing member 28 is conveniently of the construction described in a copending U.S. patent application No. 752,748, filed July 8, 1985 and entitled "Improv ments Relating to Seals" in the names of A. P. Brown and L. J. Charlebois. As shown by FIGS. 3, 4 and 5, each sealing member 28 comprises two rigid metal support plates 30 carrying between them a resiliently flexible arcuate body 32 of rubber or other plastic. The body 32 has a radially inward sealing portion 34 and is carried between the metal plates at two positions with mounting rivets 36. As shown, these rivets are located radially outwards from the body 32 and lie at the ends of radial extensions 38 of the body. As stabilizing part 40 of the sealing member extends between the extensions 38 and the whole of the body stabilizing part and the extensions is formed as an integral unit. The stabilizing part is spaced from the body to form a gap 42 which in the assembly of the body and the plates, lies in alignment with an aperture 44 formed in one of the plates (see FIG. 4).

To assemble two of the sealing members into one end of each housing 13, an elongate holding member 46 has its two ends 48 passed one through each of the orifices 44 and into the gap 42. This pre-assembly of non secured parts is then located in the housing of a mold half shown in greater detail by FIG. 4 and, as can be seen each of the sealing members is disposed in one of the recesses 24 and 26. The elongate holding member is in the form of a metal strip. This is held to a neck portion 50 of the mold part of a securing bolt 52 which passes through aligned holes in the strip and the neck portion and is received within a nut 54 held captive by the neck. The sealing members are thus restrained from moving radially and axially restraint of the sealing members is provided by parts 56 of the mold which form side members of the recesses 24 and 26.

As may be seen, the above construction is particularly useful when the encapsulations are to be formed in the field. Should it be necessary to remove or replace any of the seals, then this is a simple operation by the mere removal of the bolt 52. Within a few seconds the whole seal arrangement can be changed for seals or for seals to accommodate a different diameter cable.

What is claimed is:

1. A mold for providing an encapsulation around a cable comprising two mold halves each of which, in an unassembled condition of the mold, is a pre-formed sub-assembly, and each sub-assembly in said mold unassembled condition comprising:
   (a) a housing which defines a part of a mold cavity and has two ends with the mold cavity part between the two ends, each end of the housing defining two axially spaced semi-circular inwardly opening recesses, said housing comprising a longitudinally sectioned half of a tubular wall having longitudinal edges to abut with the opposing longitudinal edges of the housing of the other half, each recess formed by a first wall extending radially outwardly of the respective housing end, a second wall extending axially outwardly from said first wall, and a third wall extending radially inwardly from said second wall;
   (b) a semi-circular sealing member received within each recess at each end of the housing; and
   (c) each end of the housing comprising an elongate holding means secured to the housing, the holding means extending between and mechanically holding the two associated semi-circular sealing members within their recess; and
   (d) each semi-circular sealing member including an oriface spaced from the longitudinal edges of the housing for receiving an end of the holding means, the holding means comprising a flat strip, a fastener element through an aperture in said strip and the tubular wall half to fasten the holding means in place; and upon assembly together of the mold half sub-assemblies, the mold cavity is defined between housings with each semi-circular sealing member of one mold half coacting with a semi-circular sealing member of the other mold half to form a complete seal.

2. A mold according to claim 1 wherein each semi-circular sealing member comprises a resilient body and a rigid support means, the rigid support means formed with said orifice to receive the elongate holding member.

3. An mold according to claim 2 wherein the resilient body provides a space into which the elongate holding member also extends.

4. A mold according to claim 2 wherein said fastener element comprises a screw-threaded means holding the strip against the respective housing member.

* * * * *